Oct. 7, 1958  R. F. WORLIDGE  2,854,989
HOSE COUPLING DEVICES
Filed June 26, 1953  3 Sheets-Sheet 1
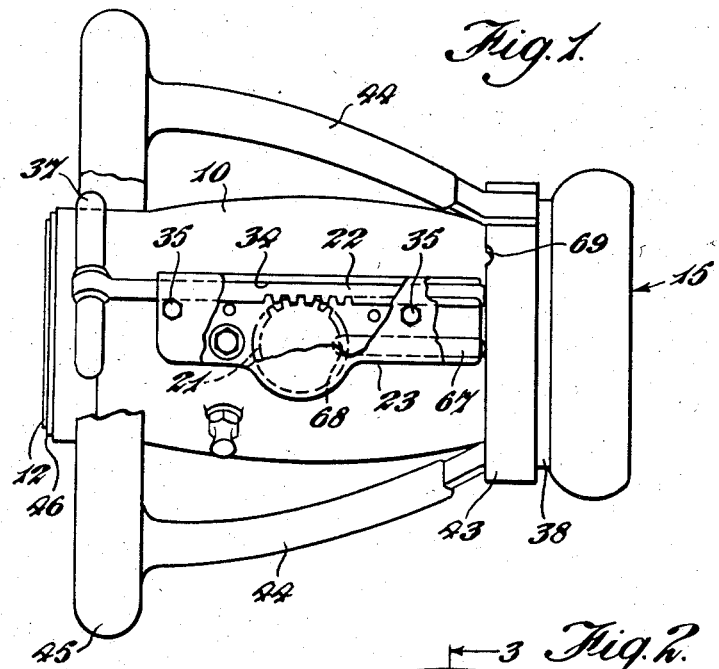
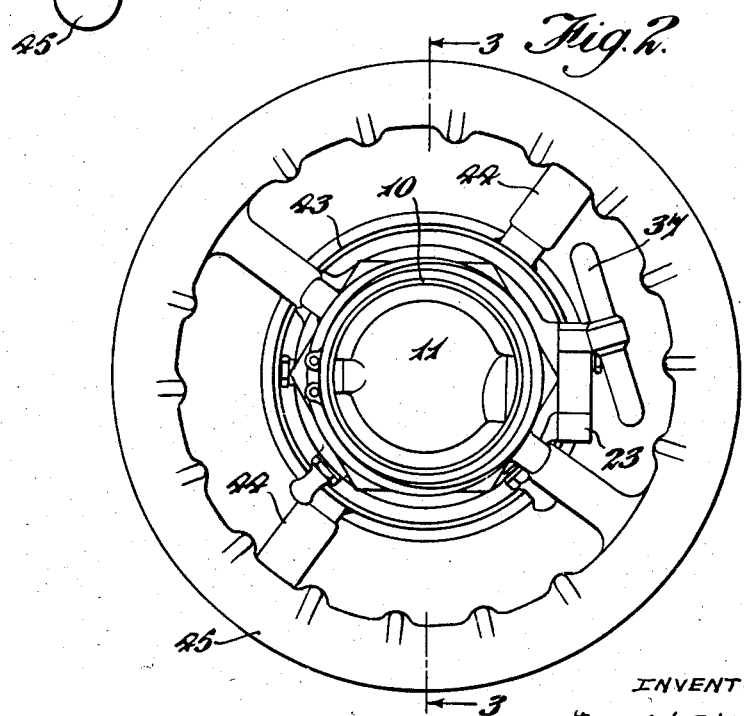
INVENTOR
Ronald F. Worlidge
By Watson, Cole, Grindle &
Watson
ATTORNEYS Oct. 7, 1958     R. F. WORLIDGE     2,854,989
HOSE COUPLING DEVICES
Filed June 26, 1953     3 Sheets-Sheet 2
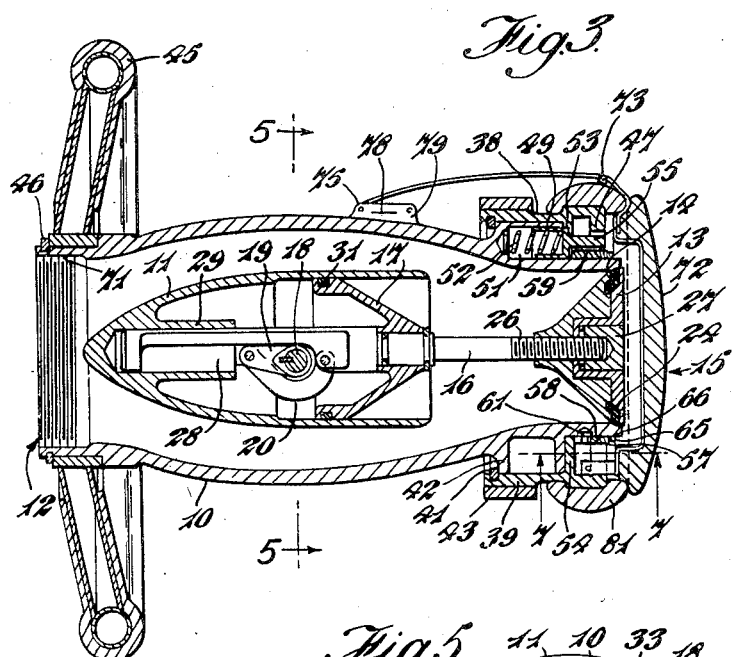
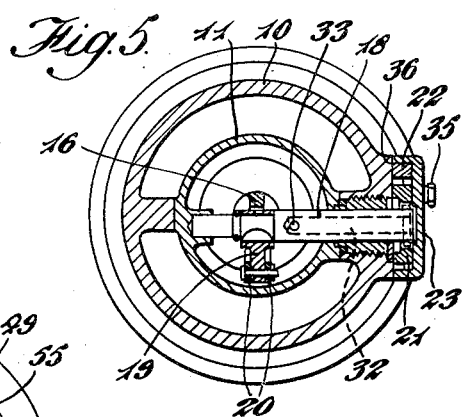
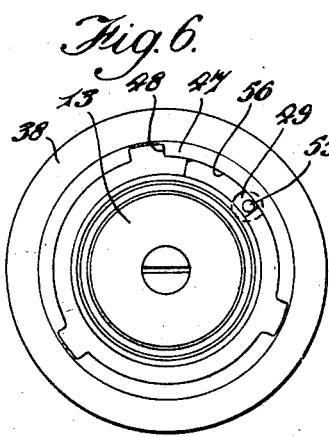
INVENTOR
Ronald F. Worlidge
By Watson, Cole, Grindle & Watson
ATTORNEYS.

INVENTOR
Ronald F. Worlidge
By Watson Cole Grindle
& Watson
ATTORNEYS

United States Patent Office 2,854,989
Patented Oct. 7, 1958

2,854,989

HOSE COUPLING DEVICES

Ronald F. Worlidge, Lower Parkstone, England, assignor to Flight Refuelling Limited, Tarrant Rushton Airfield, near Blandford, England Application June 26, 1953, Serial No. 364,437

Claims priority, application Great Britain March 30, 1953

1 Claim. (Cl. 137—219)

This invention relates to hose coupling devices, more particularly for attaching to the filling orifices of fuel and like tanks the hoses through which liquid is supplied to fill the tanks, and has been especially designed for use in the ground refuelling of aircraft, though it is equally applicable to other purposes.

A hose coupling device according to the invention includes a body, a valve member to close the passage therethrough and acted upon in a direction tending to open it by fluid in the coupling device, a piston coupled to said valve member and providing a partial counterbalance therefor, and means for manually opening and closing said valve, which means are self-locking in the valve-closed position.

A hose coupling device according to the invention may include a tubular body, a valve member axially movable in said body and adapted to engage a seat in said body to close the passage therethrough, a cylinder co-axially mounted in the body and closed at its end remote from the valve member, a piston in the cylinder connected to the valve member so as to move as one therewith, said piston having an effective area slightly smaller than that of the valve member, passage means connecting the closed end of the cylinder to the exterior of the body, and means for moving the valve member between its open and closed positions, said means being self-locking when the valve member is in the closed position.

The invention is hereinafter described with reference to the accompanying drawings, in which:

Figure 1 is an elevation with some parts broken away, of one form of hose coupling device according to the invention;

Figure 2 is an end view looking from the left hand end of Figure 1;

Figure 3 is a section on the line 3—3 of Figure 2, showing the valve of the coupling device closed;

Figure 5 is a section on the line 5—5 of Figure 3;

Figure 6 is an end elevation looking from the right-hand end of Figure 1; and

Figure 4:
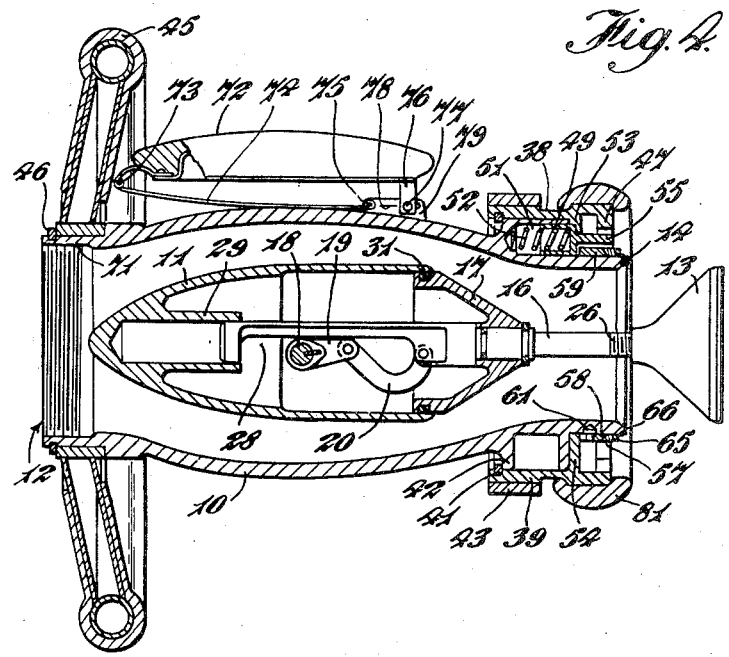
Figure 4 is a view similar to Figure 3 but showing the valve open.

Referring to the drawings, the coupling device shown therein comprises a tubular body 10, which swells outwardly between its ends to accommodate, without restriction of flow of liquid through the body, a cylinder member 11 tapering to a closed end towards the end 12 of the body at which the liquid enters. A mushroom valve member 13 cooperating with a seating 14 at the other end 15 of the body 10, and movable outwardly from that end of the body to its open position, is mounted on a stem 16 on which is also fixed a piston 17, of slightly smaller diameter than the valve member 13, the piston 17 being slidable in the cylinder member 11, the end of the cylinder member which faces the end 15 of the body being open. A spindle 18 extending into the cylinder member 11 from the exterior of the coupling device, and having its axis perpendicular to that of the said device, has fixed to its inner end a crank arm 19 coupled by a pair of pivoted curved links 20 to the valve stem 16. The spindle 18 carries, at its outer end, a pinion 21 meshing with a rack 22 in a gear casing 23, so that by sliding the rack 22 to and fro the spindle 18 is rotated and the valve is opened and closed. The parts are so arranged that the crank arm 19 extends towards the valve member 13 and lies in line with the axis of the body when the valve is open as shown in Figure 4, the crank arm turning through just over 180° to the valve closed position shown in Figure 3, the curvature of the links 20 enabling it to take up this latter position. It will be seen that the valve member 13, when fully closed, cannot be opened by pressure acting on it, since the crank arm 19 has passed over a "dead-centre" position. For convenience, the crank arm is shown in Figure 5 in its mid position.

The valve member 13 carries a deformable ring 24 which engages the tapered seat 14 in the end 15 of the body when the valve is closed, and the said member has a screw engagement with the stem 16 at 26, so that its position on the stem can be adjusted. A lock nut 27 is provided to hold it in position on the stem. The stem 16 is cut away at 28 to receive the crank-arm 19, and slides in a guide 29 in the cylinder member 11. The piston 17 is provided with a packing ring 31. The spindle 18 is bored axially as shown at 32 in Figure 5, the space between the closed end of the cylinder member 11 and the piston 17 being connected to the exterior of the coupling device through this bore 32 and a communicating diametral bore 33. The rack 22 is guided for sliding motion in the direction of the axis of the body 10 by a guide surface 34 in the gear casing 23, the gear casing being secured, by set bolts 35, to a flat surface 36 on the exterior of the body. A handle 37 is provided for manipulating the rack.

The body 10 carries, at the end 15, an external rotatable coupling ring 38 including a skirt 39 which is grooved internally to receive a spring ring 41 engaging the back of a flange 42 on the body to hold the ring 38 in position. The skirt 39 is splined to engage a ring 43 mounted on arms 44 extending from a wheel 45 mounted on the other end of the body and held in position by a spring ring 46. The coupling ring 38 has an internal flange 47 notched in three places as at 48 for the passage of lugs on an inlet fitting (not shown) of a tank or the like to be filled, to provide a coupling of the bayonet type. A lock is provided to hold the coupling ring against rotation on the body, the lock consisting of a plunger 49 (Figure 3) housed in a recess 51 in the body and urged by a spring 52 into a socket 53 on a second internal flange 54 in the coupling ring. The plunger 49 has an axially projecting stem 55 adapted to be engaged by the inlet fitting when the coupling device is connected thereto, to displace the plunger 49 from the socket 53 and release the coupling ring 38 for turning movement on the body 10. The stem 55 passes through an arcuate notch 56 in the flange 54, as shown in Figure 6, the circumferential length of the notch 56 determining the relative angular movement of the coupling ring 38 and the body 10.

Figure 7:
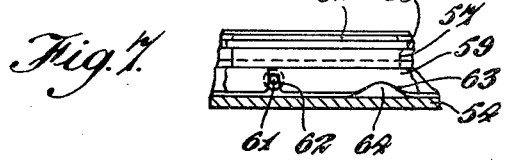
Figure 7 is a section on the line 7—7 of Figure 3, showing a detail.

Mounted externally on the end 15 of the body 10 is a packing ring 57 having an internally chamfered edge 58 co-operating with the externally chamfered edge of a metal ring 59 held against rotation on the body 10 by a pin 61 engaging a recess in the body and entering a slot 62 in the ring 59. The metal ring 59 is formed with cam notches 63 co-operating with cam lugs 64 (Figure 7) on the flange 54, the arrangement being such that rotation of the coupling ring 38 relative to the body 10 away from the position in which the locking plunger 49 is engageable moves the metal ring 59 axially towards the end 15 of the body and thus expands the packing ring 57, which engages with a surrounding surface in the inlet fitting. The packing ring is retained in position on the body by a backing ring 65 and spring ring 66.

An interlock is provided to prevent the valve member 13 from being moved to its open position unless the coupling device is properly engaged with an inlet fitting, and to prevent the coupling device from being removed from an inlet fitting unless the valve member 13 is in the closed position. The interlock comprises a locking bar 67 slidably guided in the gear casing 23, as shown in Figure 1, the bar 67 having rounded ends and co-operating with two notches 68 and 69, the notch 68 being formed in the periphery of the pinion 21, and the notch 69 being formed in the ring 43. The bar 67 is of such a length that it can move out of one notch only when the two notches are in alignment so that it can move into the other, and the two notches are in alignment only when the coupling device is properly engaged with an inlet fitting and the valve member 13 is closed.

The body is screw-threaded internally at the end 12, as shown at 71, for the attachment thereto of a flexible hose. When a refuelling operation is to be carried out, the coupling device is brought up to the inlet fitting on the tank to be filled, and the lugs on the inlet fitting are passed through the notches 48 in the flange 47. The plunger 49 is displaced by the inlet fitting to free the coupling ring 38 for rotation on the body 10, and the ring 38 is turned, by means of the wheel 45, to engage the lugs on the inlet fitting with the back of the flange 47, and thus lock the coupling device to the inlet fitting. The body 10 remains stationary during this movement of the coupling ring 38, and the relative movement between them brings the notch 69 into line with the locking bar 67. The pinion 21 is then free to turn, and the rack 22 can be moved to start opening the valve member 13. Once the crank arm 19 has been moved past the dead-centre position the opening of the valve member can be completed by the liquid flowing through the coupling device, owing to the difference in area between the valve member 13 and the piston 17. The difference between these areas is, however, so small that the valve member 13 can readily be moved to the closed position by operation of the rack 22, regardless of the liquid pressure in the coupling device. When the valve member 13 has been moved to the closed position, thus bringing the notch 68 in the pinion 21 opposite the end of the locking bar 67, the coupling device can be removed from the inlet fitting by reversing the procedure described for connecting it thereto.

A dust-cap 72 is provided for closing the end of the coupling device in which the valve member 13 is seated, the dust-cap 72 being pivotally mounted at 73 on a link 74 which is in turn pivotally mounted at 75 on the side of the body 10. The cap 72 carries a projection 76 provided with a pair of ball detents, one of which is shown at 77, the projection passing, when the dust cap is in its operative position, as shown in Figure 3, through one of the notches 47 in the flange 47, and being held in position therein by the detents 77. When the coupling device is in use, the cap 72 is stowed in the position shown in Figure 4, being held in this position by the detents 77 which engage with internal shoulders 78 on a slotted lug 79 formed on the side of the body 10. The dust-cap 72, when in its operative position, engages at its periphery with a buffer ring 81 of rubber surrounding the coupling ring 38 and serving to protect the coupling ring from damage.

I claim:

A hose coupling comprising a generally cylindrical body having an axial passage therethrough communicating with an axially directed valve seat, a cylinder supported generally coaxially in said passage and spaced radially inwardly from said body to permit movement of fluid through the passage, said cylinder being closed at one end and having its other end opening toward said valve seat, a piston reciprocable axially within said cylinder, and functioning to substantially prevent leakage of fluid from said passage into the cylinder interior on the side of said piston remote from said valve seat, a valve closure member connected to the piston for axial movement toward and away from the seat, the piston being of slightly less diameter than said valve closure member to partially balance same, actuating means operatively associated with the piston for transmitting axial movement to said piston, said actuating means including a rock shaft journalled diametrically through said body and said cylinder, a crank arm on said rock shaft and means connecting said crank arm to said piston, said crank arm being arranged for movement through and just past a dead center position as the valve closure member is seated, and stop means in said cylinder positioned to limit such movement of the crank arm.

References Cited in the file of this patent
UNITED STATES PATENTS

| | | |
|---|---|---|
| 868,130 | Russell | Oct. 15, 1907 |
| 1,118,594 | Spencer | Nov. 24, 1914 |
| 1,268,597 | Montreuil | June 4, 1918 |
| 1,336,316 | Polcho | Apr. 6, 1920 |
| 1,576,040 | Dial | Mar. 9, 1926 |
| 1,590,359 | Foote | June 29, 1926 |
| 1,627,402 | Muhfeld | May 3, 1927 |
| 2,361,685 | Griese | Oct. 31, 1944 |
| 2,403,751 | Palmer | July 9, 1946 |
| 2,439,275 | Spotz | Apr. 6, 1948 |
| 2,461,705 | Stranberg | Feb. 15, 1949 |
| 2,519,358 | Davies | Aug. 22, 1950 |
| 2,653,832 | Carter | Sept. 29, 1953 |
| 2,665,925 | Fraser | Jan. 12, 1954 |
| 2,680,030 | Hoelzer | June 1, 1954 |

FOREIGN PATENTS

| | | |
|---|---|---|
| 1,834 | Great Britain | of 1914 |